(12) United States Patent
Li et al.

(10) Patent No.: US 11,314,524 B2
(45) Date of Patent: Apr. 26, 2022

(54) METHOD, APPARATUS, AND COMPUTER PROGRAM PRODUCT FOR MANAGING SERVICE CONTAINER

(71) Applicant: EMC IP Holding Company LLC, Hopkinton, MA (US)

(72) Inventors: Samuel Li, Chengdu (CN); Terry Xu, Chengdu (CN); Eddie Dai, Chengdu (CN); Eason Jiang, Chengdu (CN); Zhongyi Zhou, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 141 days.

(21) Appl. No.: 16/285,150

(22) Filed: Feb. 25, 2019

(65) Prior Publication Data

US 2020/0117478 A1    Apr. 16, 2020

(30) Foreign Application Priority Data

Oct. 12, 2018    (CN) .......................... 201811191506.X

(51) Int. Cl.
*G06F 9/445* (2018.01)
*G06F 11/14* (2006.01)
*G06F 8/61* (2018.01)

(52) U.S. Cl.
CPC ............ *G06F 9/44505* (2013.01); *G06F 8/61* (2013.01); *G06F 11/1469* (2013.01); *G06F 2201/82* (2013.01); *G06F 2201/84* (2013.01)

(58) Field of Classification Search
CPC ............ G06F 11/1469; G06F 2201/82; G06F 2201/84; G06F 8/61; G06F 9/44505; G06F 11/1458; G06F 11/1461; G06F 9/455

See application file for complete search history.

(56) References Cited

U.S. PATENT DOCUMENTS 9,465,697 B2 * 10/2016 Robinson ............ G06F 11/1458
10,013,189 B1 * 7/2018 Yang ..................... G06F 3/0619

(Continued)

*Primary Examiner* — Bryce P Bonzo
*Assistant Examiner* — Michael Xu
(74) *Attorney, Agent, or Firm* — Womble Bond Dickinson (US) LLP

(57) ABSTRACT

The present disclosure relates to a method, apparatus and computer program product for managing service containers. According to example implementations of the present disclosure, there is provided a method for managing a group of service containers. In the method, in response to receiving a backup demand on a group of to-be-generated service containers, a configuration file for generating the group of service containers is built on the basis of the backup demand, the configuration file comprising scripts for installing backup agencies that perform backup operations to the group of service containers. An image file for initializing the group of service containers is loaded to at least one node in a service container management system so as to create a group of basic running environments. The configuration file is deployed to the group of basic running environments to generate the group of service containers, so that a corresponding backup agency comprised in a corresponding service container in the group of generated service containers performs the backup operation to the group of generated service containers. Further, there is provided an apparatus and computer program product for managing a group of service containers.

18 Claims, 9 Drawing Sheets

(56) References Cited

U.S. PATENT DOCUMENTS

| | | | |
|---|---|---|---|
| 10,013,291 B1* | 7/2018 | Nielsen | G06F 11/1438 |
| 2014/0047439 A1* | 2/2014 | Levy | H04L 41/048 |
| | | | 718/1 |
| 2014/0053150 A1* | 2/2014 | Barnett | G06F 9/45558 |
| | | | 718/1 |
| 2015/0074362 A1* | 3/2015 | Mohl | G06F 3/0667 |
| | | | 711/162 |
| 2017/0357553 A1* | 12/2017 | Zhao | G06F 16/907 |
| 2019/0095102 A1* | 3/2019 | Wade | G06F 3/0619 |

\* cited by examiner

METHOD, APPARATUS, AND COMPUTER PROGRAM PRODUCT FOR MANAGING SERVICE CONTAINER

CROSS-REFERENCE TO RELATED APPLICATION

This patent application claims priority, under 35 U.S.C. § 119, of Chinese Patent Application No. 201811191506.X, filed Oct. 12, 2018, entitled "METHOD, APPARATUS, AND COMPUTER PROGRAM PRODUCT FOR MANAGING SERVICE CONTAINER."

FIELD

Various implementations of the present disclosure relate to data management, and more specifically, to a method, apparatus and computer program product for managing service containers.

BACKGROUND

With the development of computer technology, data backup techniques have been widely applied to various types of application programs. At present, more and more applications are developed on the basis of "container" technology. The container here is a technology for encapsulating services, which allows developers to encapsulate various services associated with applications. For the purpose of brevity, the service container may be called container for short. Further, a wide range of containers may serve as modules for subsequent development. For example, the application program may be developed on the basis of one or more containers.

In the running process of various application systems, backup operations usually need to be performed to data in an application program, so that the application program may be restored on the basis of backup data where a failure or other situation occurs in the application. Since the service container is a basis for the application, it becomes a focus of research regarding how to manage the service container in a more secure and reliable way.

SUMMARY

Therefore, it is desirable to develop and implement a technical solution for managing service containers more effectively. It is desired that the technical solution can be compatible with existing application environments and manage service containers more effectively by reconstructing various configurations of existing application environments.

According to a first aspect of the present disclosure, there is provided a method for managing service containers. In the method, in response to receiving a backup demand on a group of to-be-generated service containers, a configuration file for generating the group of service containers is built on the basis of the backup demand, the configuration file comprising scripts for installing backup agencies that perform backup operations to the group of service containers; an image file for initializing the group of service containers is loaded to at least one node in a service container management system so as to create a group of basic running environments; and the configuration file is deployed to the group of basic running environments to generate the group of service containers, so that a corresponding backup agency comprised in a corresponding service container in the group of generated service containers performs the backup operation to the group of generated service containers.

According to a second aspect of the present disclosure, there is provided a method for managing service containers. In the method, an image file for initializing a group of to-be-generated service containers is loaded at a service container management system so as to form a group of basic running environments; in response to receiving a configuration file for generating the group of service containers, the configuration file is deployed to the group of basic running environment to generate the group of service containers, so that a corresponding backup agency comprised in a corresponding service container in the group of generated service containers performs a backup operation to the group of generated service containers, wherein the configuration file comprises scripts for installing backup agencies that perform backup operations to the group of service containers, and the configuration file is built on the basis of a backup demand on a group of to-be-generated service containers.

According to a third aspect of the present disclosure, there is provided an apparatus for managing service containers, comprising: at least one processor; a volatile memory; and a memory coupled to the at least one processor, the memory having instructions stored thereon, the instructions, when executed by the at least one processor, causing the apparatus to perform acts. The act includes: in response to receiving a backup demand on a group of to-be-generated service containers, building a configuration file for generating the group of service containers on the basis of the backup demand, the configuration file comprising scripts for installing backup agencies that perform backup operations to the group of service containers; loading an image file for initializing the group of service containers to at least one node in a service container management system so as to create a group of basic running environments; and deploying the configuration file to the group of basic running environments to generate the group of service containers, so that a corresponding backup agency comprised in a corresponding service container in the group of generated service containers performs the backup operation to the group of generated service containers.

According to a fourth aspect of the present disclosure, there is provided an apparatus for managing service containers, comprising: at least one processor; a volatile memory; and a memory coupled to the at least one processor, the memory having instructions stored thereon, the instructions, when executed by the at least one processor, causing the apparatus to perform acts. The acts include: loading at a service container management system an image file for initializing a group of to-be-generated service containers so as to form a group of basic running environments; in response to receiving a configuration file for generating the group of service containers, deploying the configuration file to the group of basic running environment to generate the group of service containers, so that a corresponding backup agency comprised in a corresponding service container in the group of generated service containers performs a backup operation to the group of generated service containers, wherein the configuration file comprises scripts for installing backup agencies that perform backup operations to the group of service containers, and the configuration file is built on the basis of a backup demand on a group of to-be-generated service containers.

According to a fifth aspect of the present disclosure, there is provided a computer program product. The computer program product is tangibly stored on a non-transient computer readable medium and comprises machine executable instructions which are used to implement a method according to the first aspect.

According to a sixth aspect of the present disclosure, there is provided a computer readable medium. The computer program product is tangibly stored on a non-transient computer readable medium and comprises machine executable instructions which are used to implement a method according to the second aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

With the development of cloud technology, more and more application programs are developed on the basis of "container" technology. Specifically, for an application dedicated to online sales over the Internet, the application may involve interface service for controlling a display interface and database service for controlling background statistical data related to inventory. Developers may encapsulate the interface service to an interface container and encapsulate the database service to a database container. At this point, the interface container and the database container may be called respectively, so as to create the online sales application.

Figure 1:
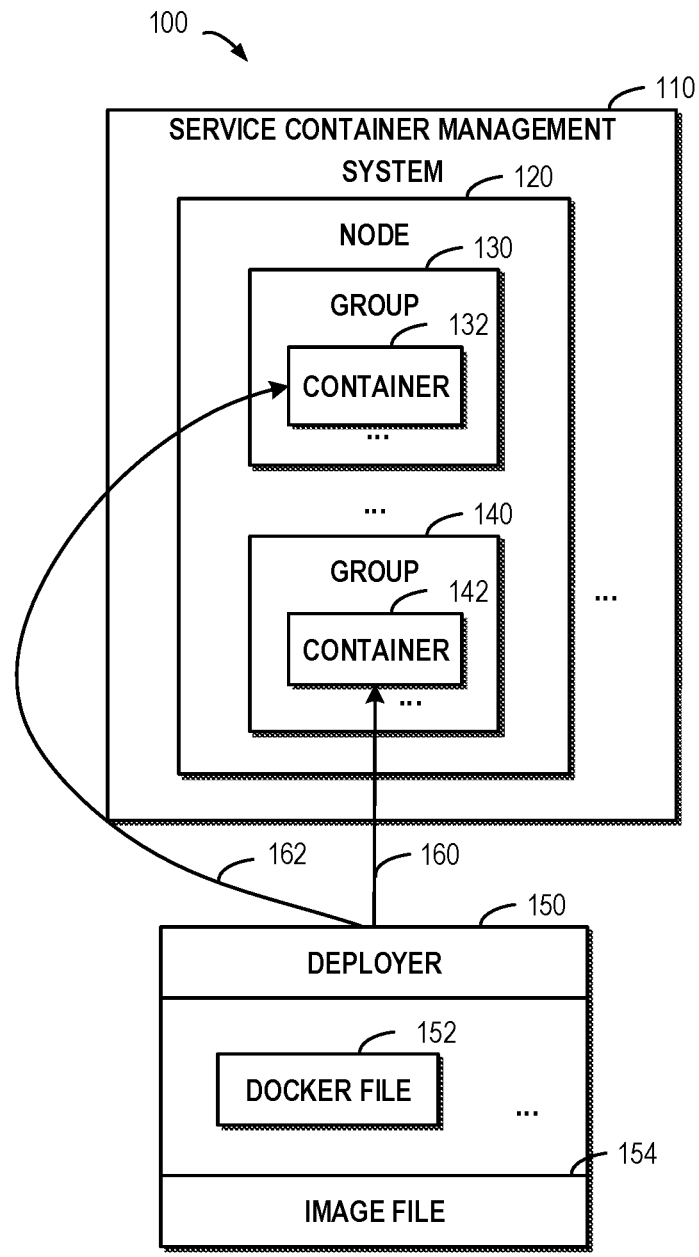
FIG. 1 schematically illustrates a block diagram of an application environment in which implementations of the present disclosure may be applied.

As varieties and number of containers increase gradually, current service container management system 110 and deployer 150 can manage multiple containers in a centralized way. FIG. 1 schematically shows a block diagram of an application environment 100 in which implementations of the present disclosure may be applied. As depicted, the service container management system 110 may comprise a node 120, and the node 120 may comprise groups 130, . . . , 140. As depicted, the group 130 may comprise a container 132, and alternatively, the group 130 may comprise one or more further containers. The group may comprise a container 142, and alternatively, the group may comprise one or more further containers. It will be understood FIG. 1 merely illustrates an example of the application environment 100. In other examples, the service container management system 110 may comprise one or more nodes 120, each node may comprise one or more groups and each group may comprise one or more containers.

The deployer 150 may be used to deploy containers to the service container management system 110. Specifically, the deployer 150 may generate corresponding containers 132 and 142 (as shown by arrows 162 and 160) on the basis of an image file (e.g. a docker image for creating a basic running environment of a container) and a Docker file (e.g. a script file for installing a service associated with a to-be-generated container).

In the running process of an application, one or more containers involved by the application might fail, at which point common practice is to restore the container(s) to the last normal status before the failure occurs. However, at present a backup program has to be installed on each container one by one, and the installed backup program backs up the status of the container separately. Usually the service container management system 110 may comprise thousands and even tens of thousands of containers, at which point to install a backup program to each container and perform a backup will cause huge time and computing resource overheads. As varieties and number of containers increase day by day, it becomes a focus of research regarding how to manage various containers in the service container management system 110 in a more reliable and effective way.

Figure 2:
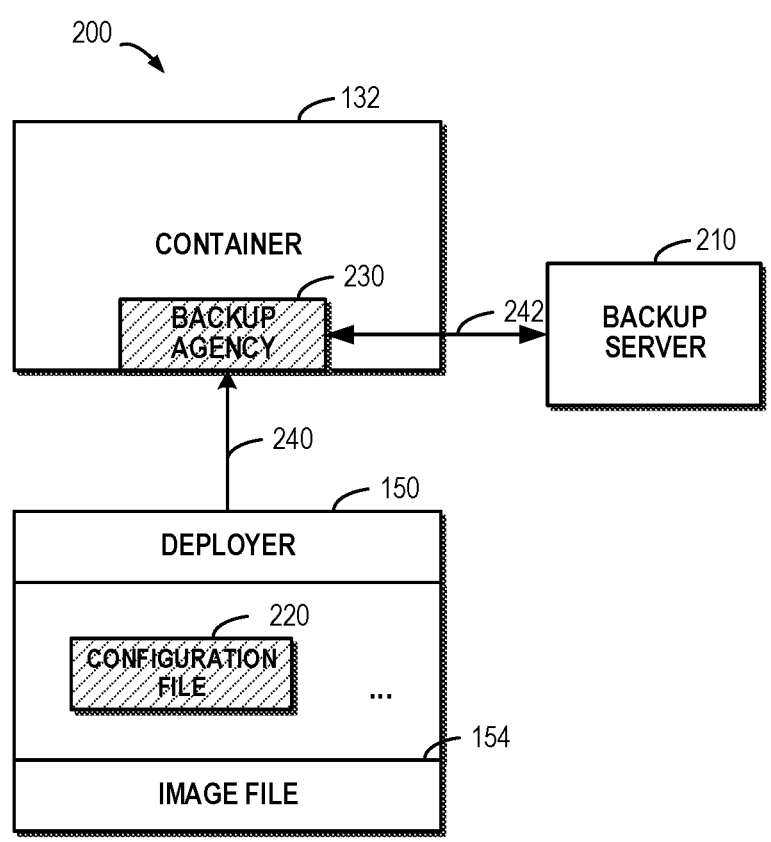
FIG. 2 schematically illustrates a block diagram for managing service containers according to implementations of the present disclosure.

To at least partly solve problems in existing technical solutions, according to example implementations of the present disclosure, there is proposed a method, apparatus and computer program product for managing service containers. With reference to FIG. 2, a general description is presented below to example implementations of the present disclosure. FIG. 2 schematically shows a block diagram for managing service containers according to implementations of the present disclosure. As depicted, according to example implementations of the present disclosure, a configuration file 220 for generating the container 132 may be created, here the configuration file 220 comprising scripts for installing a backup agency 230 that performs a backup operation to the to-be-generated container 132. In this way, the backup agency 230 can perform backup operations to various data in the container 132. Subsequently, as shown by an arrow 242, backup data may be sent from the backup agency 230 to a backup server 210; alternatively, the backup agency 230 may further receive backup data from the backup server 210, for restoring the container 132 to a corresponding status.

It will be understood although FIG. 2 merely illustrates one container 132, the foregoing method may further be used for managing a group of to-be-generated containers. At this point, a configuration file for generating a group of containers may be created, here the configuration file comprising scripts for installing a backup agency that performs backup operations to the group of to-be-generated containers. For example, continuing the above examples of interface container and database container, respective configuration files for the interface container and the database container may be created. With the configuration files, a group of interface containers and a group of database containers may be generated, at which point each container as generated comprises a backup agency for performing a backup operation to the container.

With the foregoing example implementations, during generating a group of service containers, a backup agency for performing a backup operation to a service container may be embedded to the generated service container. After the group of service containers are generated, these service containers have a backup function. Therefore, the backup agency does not have to be installed to each service container in a group of service containers one by one, and further multiple service containers may be managed in a more effective and reliable way. Usually the number of service containers in the service container management system 110 will amount to several thousand. At this point, various service containers may be managed uniformly, and thus time overhead for performing a backup operation to each container separately may be reduced greatly.

Figure 3:
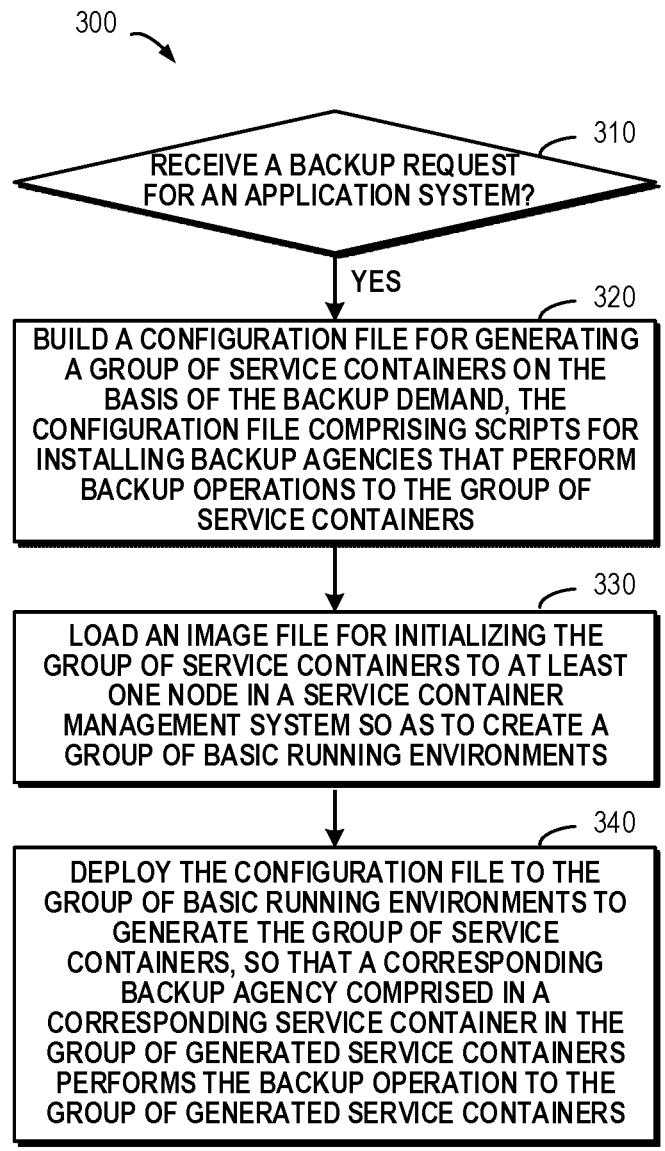
FIG. 3 schematically illustrates a flowchart of a method for managing a group of service containers according to implementations of the present disclosure.

With reference to FIG. 3, a detailed description is presented below to more details about a method for managing service containers. FIG. 3 schematically shows a flowchart of a method 300 for managing a group of service containers according to implementations of the present disclosure. At block 310, it is determined whether a backup demand for a group of to-be-generated service containers is received. Here, the backup demand may comprise contents in various aspects, e.g. may comprise information on a backup agency and may further comprise information on a backup server. If it is determined a backup demand is received, then the method 300 proceeds to block 320.

Figure 4:
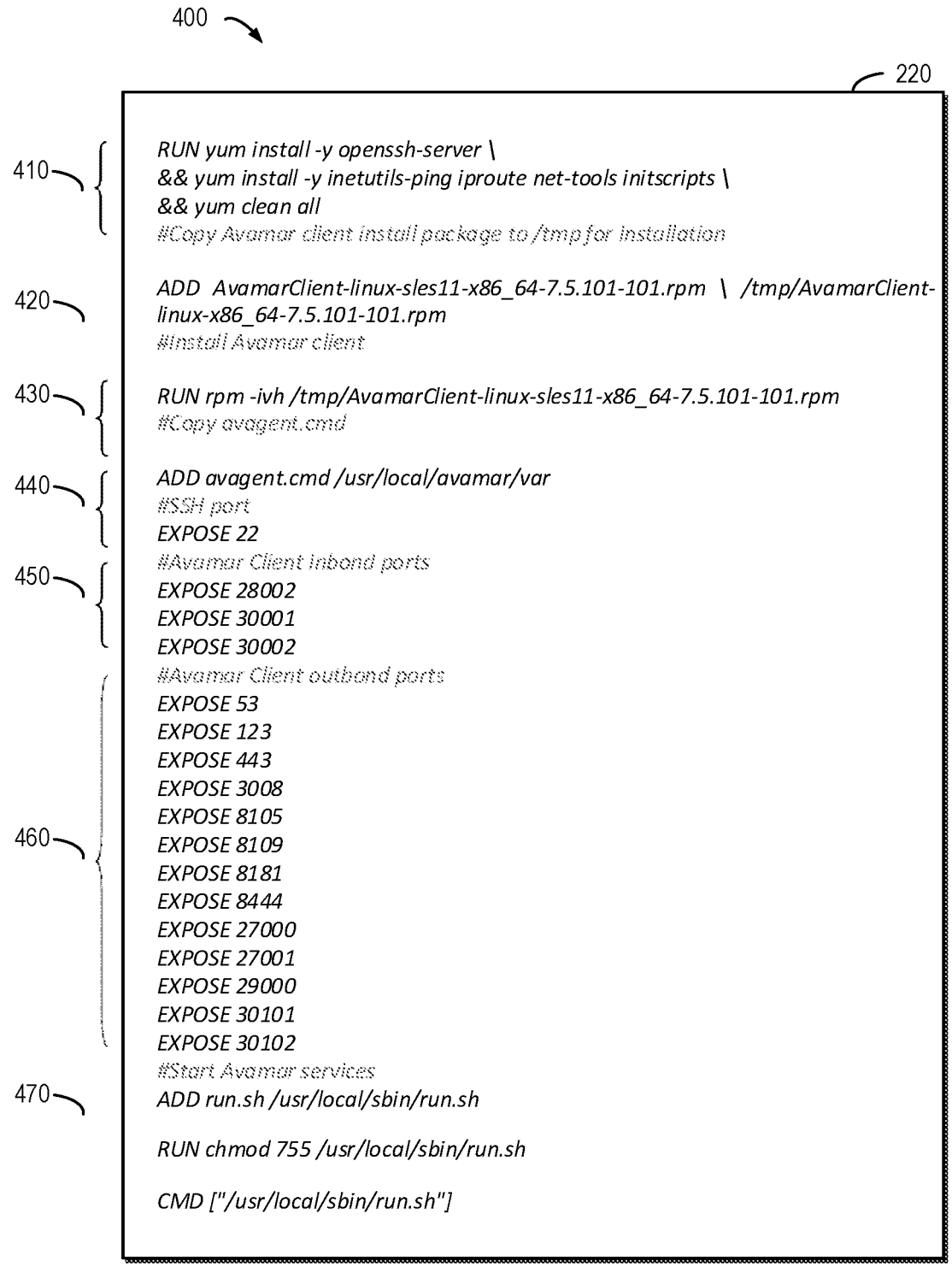
FIG. 4 schematically illustrates a block diagram of a configuration file according to implementations of the present disclosure.

At block 320, a configuration file 220 for generating a group of service containers may be created on the basis of the backup demand. It will be understood the configuration file 220 here comprises scripts for installing a backup agency 230 that performs backup operations to the group of service containers. With reference to FIG. 4, description is presented below to more details about scripts. FIG. 4 shows a schematic view 400 of a configuration file according to implementations of the present disclosure. As depicted, at the beginning of the configuration file 220, a script fragment 410 is used to initiate a basic function associated with installing the backup agency 230. A script fragment 420 is used to copy an install program "Avamar" of the backup agency 230 to a temporary path for the sake of installation. As shown in FIG. 4, the name of the install program here is AvamarClient-linux-sles11-x86_64-7.5.101-101.rpm, and the install program is copied to a directory \tmp so as to form a temporary file AvamarClient-linux-x86_64-7.5.101-101.rpm. Next, a script fragment 430 is used to run the install program in the directory \tmp so as to install the backup agency 230 while generating the container 132.

It will be understood since the backup agency 230 needs to communicate with the external backup server 210 so as to transmit backup data between the backup server 210 and the container 132, a port for transmitting data between the backup agency 230 and the backup server 210 needs to be defined in the configuration file. Specifically, with reference to subsequent script fragments in the configuration file 220, a script fragment 440 is used to open a port of the Secure Shell (SSH) protocol, a script fragment 450 is used to open an inbound port, and a script fragment 460 is used to open an outbound port. Further, a script fragment 470 is used to initiate various services associated with the backup agency 230. With the foregoing example implementations, various settings on installing the backup agency 230 may be added to the configuration file 220 step by step, and further it may be ensured the backup agency 230 may be installed and run correctly.

It will be understood FIG. 4 merely illustrates one simple example of the configuration file 220, and in other implementations, the configuration file 220 may comprise different scripts. For example, in view of different install programs of the backup agency 230, the script fragments 420 and 430 may comprise different contents. For example, suppose the name of the install program is "Avamar-v1.0," then at this point the script fragment 420 may comprise "ADD Avamar-v1.0.rpm\/tmp/Avamar-v1.0.rpm," and the script fragment 430 may comprise "RUN rpm-ivh/tmp/ADD Avamar-v1.0.rpm." Further, in view of network configuration of the backup agency 230 and the backup server 210, other port may further be defined in the configuration file 220 to transmit data.

According to example implementations of the present disclosure, the configuration file 220 here may further comprise scripts for installing operations associated with a container. Continuing the above example, for an interface container, the configuration file 220 may comprise scripts for installing operations associated with interface service and scripts for installing a backup agency that performs a backup operation to the interface container. For a database container, the configuration file 220 may comprise scripts for installing operations associated with database service and scripts for installing a backup agency that performs a backup operation to the database container.

Returning to FIG. 3, at block 330, an image file for initializing the group of service containers may further be loaded to at least one node in the service container management system 110 so as to create a group of basic running environments. Here the image file 154 may be used to, for example, build a basic Linux running environment. At a node of the service container management system 110, where the image file 154 has been received, the image file 154 may be run so as to create a corresponding basic running environment at the node of the service container management system 110. It will be understood here the basic running environment may provide the most basic function of Linux and provide support to run scripts in the configuration file 220 subsequently.

At block 340, the configuration file 220 is deployed to the group of basic running environments so as to generate the group of service containers. A corresponding backup agency comprised by a corresponding service container in the generated group of service containers performs the backup operation to the generated group of service containers.

According to example implementations of the present disclosure, first an indication may be sent to the at least one node so that scripts comprised in the configuration file are run in the group of basic running environments so as to generate the group of service containers. It will be understood here the basic running environment only comprises the most basic function for implementing a service container. Next, by running scripts for installing the backup agency in the basic running environment, various aspects of configuration of the backup agency may be completed gradually, and further the backup agency 230 for performing a backup operation may be obtained.

Figure 5:
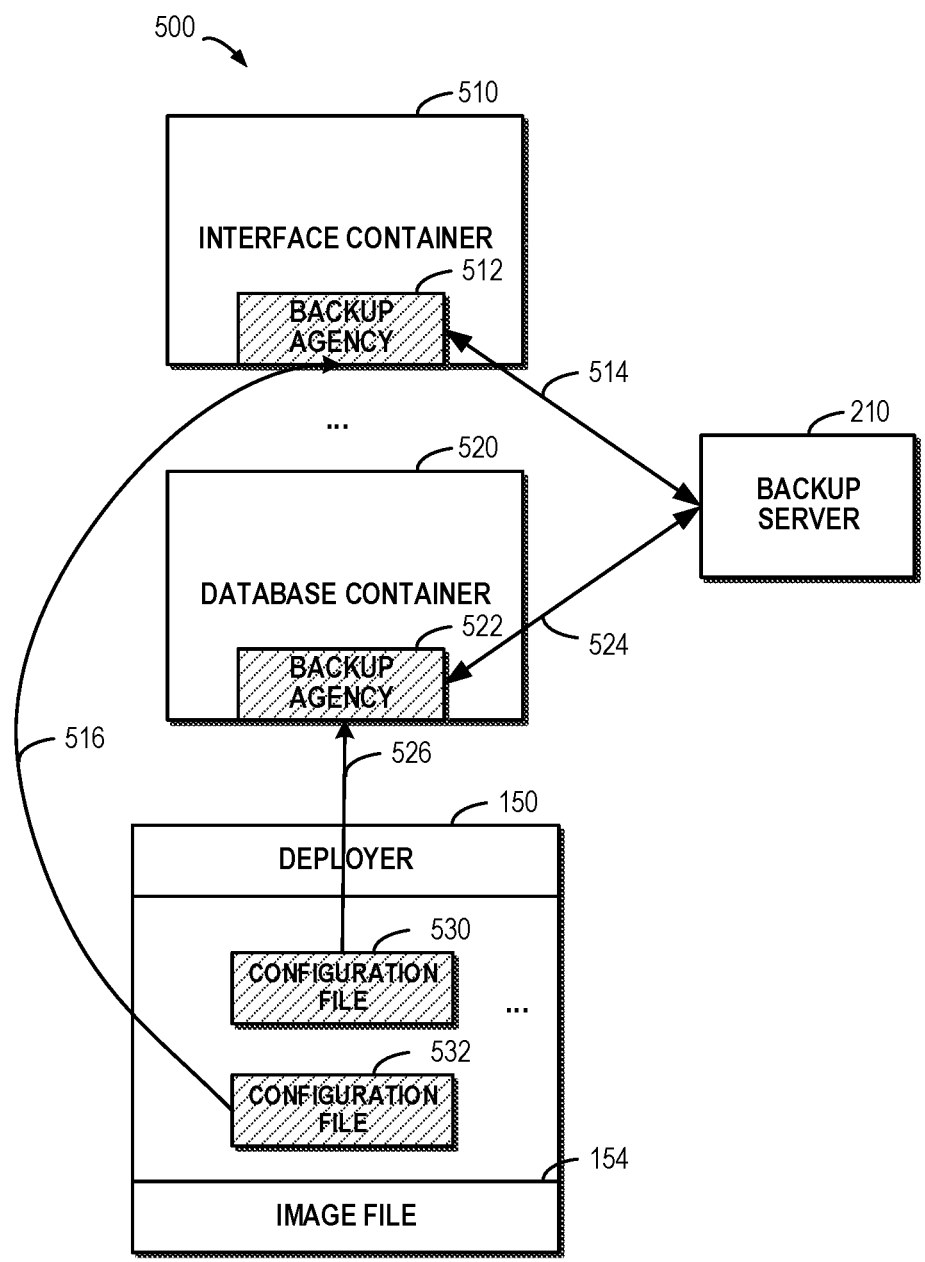
FIG. 5 schematically illustrates a block diagram for managing a group of service containers according to implementations of the present disclosure.

With reference to FIG. 5, description is presented below to more details about generating containers. FIG. 5 schematically shows a block diagram 500 for managing a group of service containers according to implementations of the present disclosure. As depicted, the deployer 150 may contain a configuration file 530 for generating an interface container 510 and a configuration file 532 for generating a database container 520. At this point, the configuration files 530 and 532 are generated on the basis of different backup demands.

In order to generate the interface container 510 and the database container 520, the deployer 150 first transmits the image file 154 to the node 120 in the service container management system 110 to build a basic running environment in the node 120.

Subsequently, as shown by arrows 526 and 516, the deployer 150 may further transmit the configuration files 530 and 532 to the node 120 so as to run scripts which are contained in the configuration files 530 and 532 in the built basic running environment. Specifically, the interface container 510 comprising the backup agency 512 may be generated by running scripts contained in the configuration file 532 in one basic running environment; the database container 520 comprising the backup agency 522 may be generated by running scripts contained in the configuration file 530 in another basic running environment.

In this way, when an online sales application is developed on the basis of the interface container 510 and the database container 520, the status of the online sales application may be backed up on the basis of the interface container 510 and the database container 520. For example, as shown by arrows 514 and 524, the interface container 510 and the database container 520 may communicate with the backup server 210 via the backup agencies 512 and 522 respectively, so as to transmit backup-related data.

According to example implementations of the present disclosure, there may exist different backup demands on containers. For example, regarding the interface container 510, a different install program may be used to install a different backup agency in the generated interface container. At this point, for the same type of containers, different configuration files may be generated according to different backup demands. More details will be described below with reference to FIG. 6.

Figure 6:
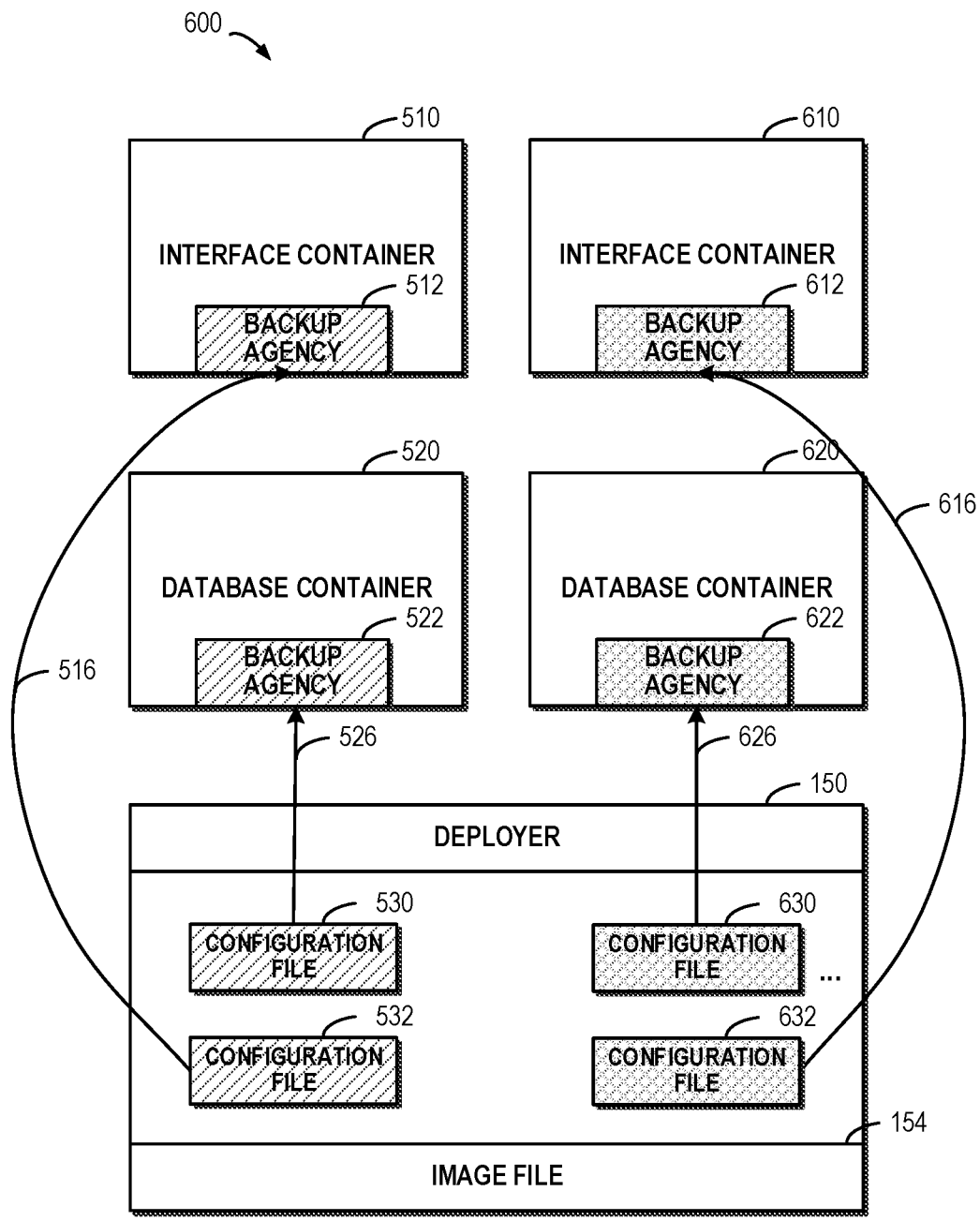
FIG. 6 schematically illustrates a block diagram for managing a group of service containers according to implementations of the present disclosure.

FIG. 6 schematically shows a block diagram 600 for managing a group of service containers according to implementations of the present disclosure. Contents of the left part in FIG. 6 are similar to a corresponding part in FIG. 5, and the right part in FIG. 6 shows the process for generating an interface container 610 and a database container 620. As shown in FIG. 6, the deployer 150 may comprise the configuration files 530 and 532 for generating the interface container 510 and the database container 520 respectively. In addition, the deployer 150 may comprise configuration files 630 and 632 for generating the interface container 610 and the database container 620 respectively.

In order to generate the interface container 610 and the database container 620, the deployer 150 first transmits the image file 154 to the node 120 in the service container management system 110 to build a basic running environment in the node 120.

Subsequently, as shown by arrows 626 and 616, the deployer 150 may further transmit the configuration files 630 and 632 to the node 120 so as to run scripts which are contained in the configuration files 630 and 632 in the built basic running environment.

Specifically, the interface container 610 comprising the backup agency 612 may be generated by running scripts contained in the configuration file 632 in one basic running environment; the database container 620 comprising the backup agency 622 may be generated by running scripts contained in the configuration file 630 in another basic running environment. It will be understood although the foregoing example shows the circumstance in which the interface containers 510 and 610 and the database containers 520 and 620 reside on the same node 120, according to example implementations of the present disclosure, these containers may reside on one or more nodes.

According to example implementations of the present disclosure, the configuration file 220 further comprises backup policies associated with backup operations. Suppose a group of interface containers have been generated at the node 120, at this point each interface container may has a customized backup policy. Here the backup policy may, for example, specify a trigger condition for performing a backup operation and relevant configuration of the backup server 210. For example, a backup policy of one interface container may define backup is performed every night, and a backup policy of another interface container may define backup is performed every day. An indication may be sent to a node where at least one part of service containers in the group of service containers reside, so that the at least one part of service containers in the group of service containers perform backup operations on the basis of a backup policy.

It will be understood various service containers in the group of service containers may have the same backup policy. Alternatively, various service containers may further have different backup policies. According to example implementations of the present disclosure, the backup policy may, for example, comprise the time when backup is performed. For example, in order to avoid a too high workload at the backup server 210, the backup policy may define backup operations are performed to one part of service containers in the nighttime and backup operations are performed to another part of service containers in the daytime. At this point, by sending a corresponding backup policy to each service container, the service container may perform a backup operation according to the defined backup policy. In this way, a backup operation may be performed to each service container in a customized manner. For example, various service containers may be grouped on the basis of their attributes, and a corresponding backup operation is performed to each group.

According to example implementations of the present disclosure, when it is detected a given service container in a group of service containers fails, a troubleshooting operation may be performed accordingly. It will be understood during run time of a group of service containers, the deployer 150 may monitor the operation status of the group of service containers. Alternatively and/or additionally, the deployer 150 may receive a monitoring result from a monitor. At this point, besides restoring the container on the basis of backup data in the backup server, the deployer 150 may generate a new service container to replace the failed service container. Specifically, the image file 154 is loaded to a node where the failed service container resides, to form a basic running environment. Then, a configuration file may be deployed to the basic running environment to form a new service container, so that a backup agency comprised in the generated new service container performs a backup operation to the generated new service container.

Continuing to refer to FIG. 6, suppose the existing online sales application is implemented on the basis of the interface container 510 and the database container 520, and the interface container 510 fails. At this point, the deployer 150 may re-load the image file 154 to the node 120 where the failed service container resides, to form a basic running environment. Subsequently, the configuration file 530 may be deployed to the basic running environment to generate a new service container. A backup agency comprised in the new service container generated here performs a backup operation to the generated new service container, and the new service container may replace the failed interface container 510. According to example implementations of the present disclosure, various resources occupied by the interface container 510 may be recycled.

With the above example implementations, when a failure is found in a group of service containers, a new service container may be generated by re-loading the image file at the failed node and deploying the configuration file. Further, it may be ensured service containers at various nodes in the service container management system operate normally.

Now that details about the method executed at the deployer 150 have been described with reference to FIGS. 2 to 6, description is presented below to a method executed at the service container management system 110 with reference to FIG. 7. This figure schematically shows a flowchart of a method 700 for managing a group of service containers according to implementations of the present disclosure. At block 710, the image file 154 for initializing a group of to-be-generated service containers may be loaded at the service container management system 110 to form a group of basic running environments. At block 720, it may be determined whether the configuration file 220 for generating the group of service containers is received or not. If it is determined the configuration file 220 is received, then the method 700 proceeds to block 730.

At block 730, the configuration file 220 is deployed to the group of basic running environments to generate the group of service containers, so that a corresponding backup agency comprised in a corresponding service container in the group of generated service containers performs a backup operation to the group of generated service containers. It will be understood here the configuration file 220 comprises scripts for installing a backup agency 230 that performs a backup operation to the group of service containers, and the configuration file 220 is built on the basis of a backup demand on a group of to-be-generated service containers.

Figure 7:
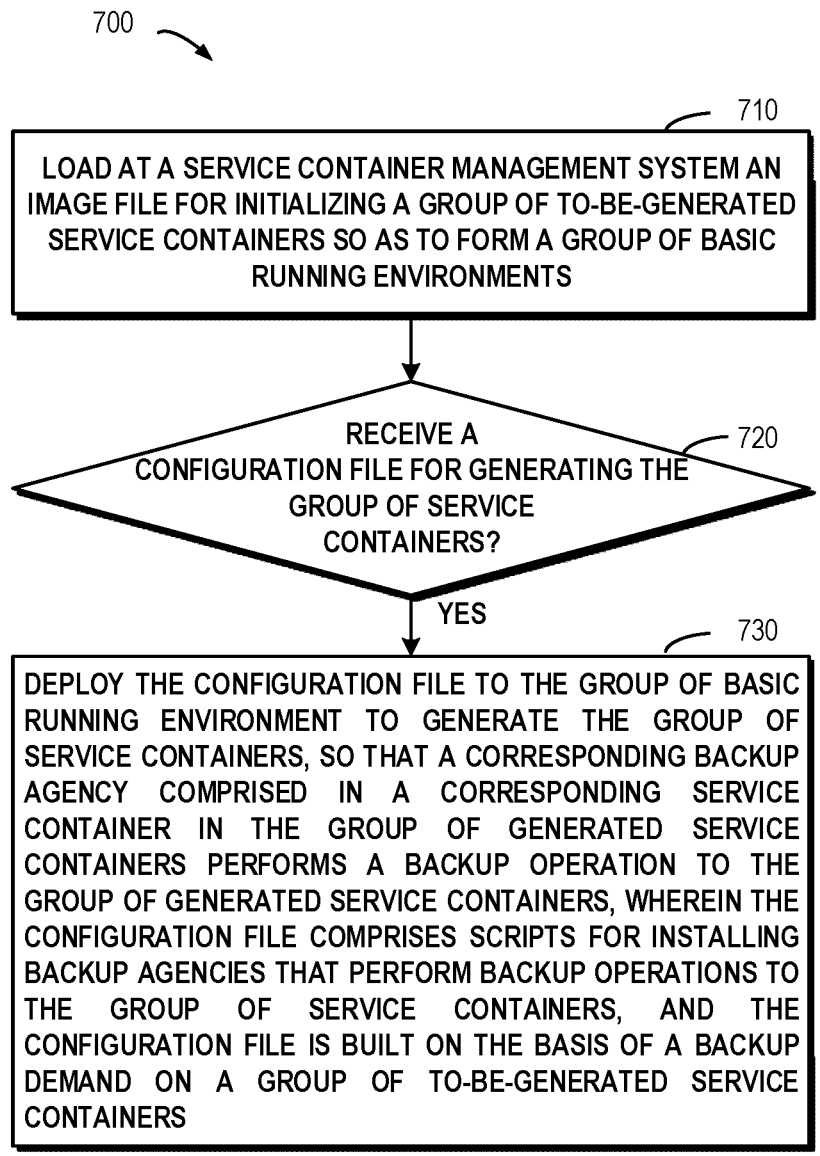
FIG. 7 schematically illustrates a flowchart of a method for managing a group of service containers according to implementations of the present disclosure.

It will be understood the method 700 executed in the service container management system 110 as shown in FIG. 7 may operate in coordination with the method executed at the deployer 150 as shown in FIG. 3, so as to generate the container 132 comprising the backup agency 230. With the above example implementations, a group of service containers may be generated in parallel on one or more nodes in the service container management system 110, and at this point, the generated group of service containers have been embedded with a function for backing up the group of generated service containers. Therefore, there is no need to install a backup agency to each service container in the group of service containers one by one, and further multiple service containers may be managed in a more efficient and reliable way. Usually the number of service containers in the service container management system 110 will amount to several hundred and even thousand. At this point, various service containers may be managed uniformly, and further time overhead for performing backup operations may be reduced significantly.

According to example implementations of the present disclosure, the configuration file 220 may comprise contents in various aspects. For example, the configuration file 220 may comprise: configuration scripts for setting an environment of the backup agency 230; installation scripts for installing the backup agency 230; and setup scripts for setting a communication port of the backup agency 230. Details about various script fragments of the configuration file 220 have been described with reference to FIG. 4, and thus are not detailed here.

According to example implementations of the present disclosure, scripts contained in the configuration file may be run in the group of basic running environments so as to generate the group of service containers. In this example implementation, the service container management system 110 may comprise multiple basic running environments, and scripts for generating the interface container 510 and the database container 520 may be run in parallel in the multiple basic running environments, so as to generate corresponding containers.

According to example implementations of the present disclosure, the configuration file 220 further comprises a backup policy associated with the backup operation. In each service container in the group of service containers, a backup agency in the service container may be used to perform a backup operation to the service container on the basis of the backup policy. For example, the backup agency 512 in the interface container 510 may perform a backup operation to the interface container 510 on the basis of the interface backup policy. Continuing the above example of an online sales application, since an interface exerts a small impact on the data security of the online sales application, the backup policy for the interface may define backup is performed once a day. For another example, the backup agency 522 in the database container 520 may perform a backup operation to the database container 520 on the basis of the database backup policy. Since a database exerts a large impact on the data security of the online sales application, the backup policy for the database may specify backup is performed once an hour.

According to example implementations of the present disclosure, the backup agency 230 may be used to traverse directories of the container 132, here the directories being directories in a file system. Then, data under each directory may be transmitted to the backup server 310 associated with the backup agency 230, so as to effect backup. According to example implementations of the present disclosure, when the container 132 fails and desires to perform a restore operation, the container 132 may request the backup server 210 for backup data in a specified version, so as to be used for a restore operation.

Figure 8:
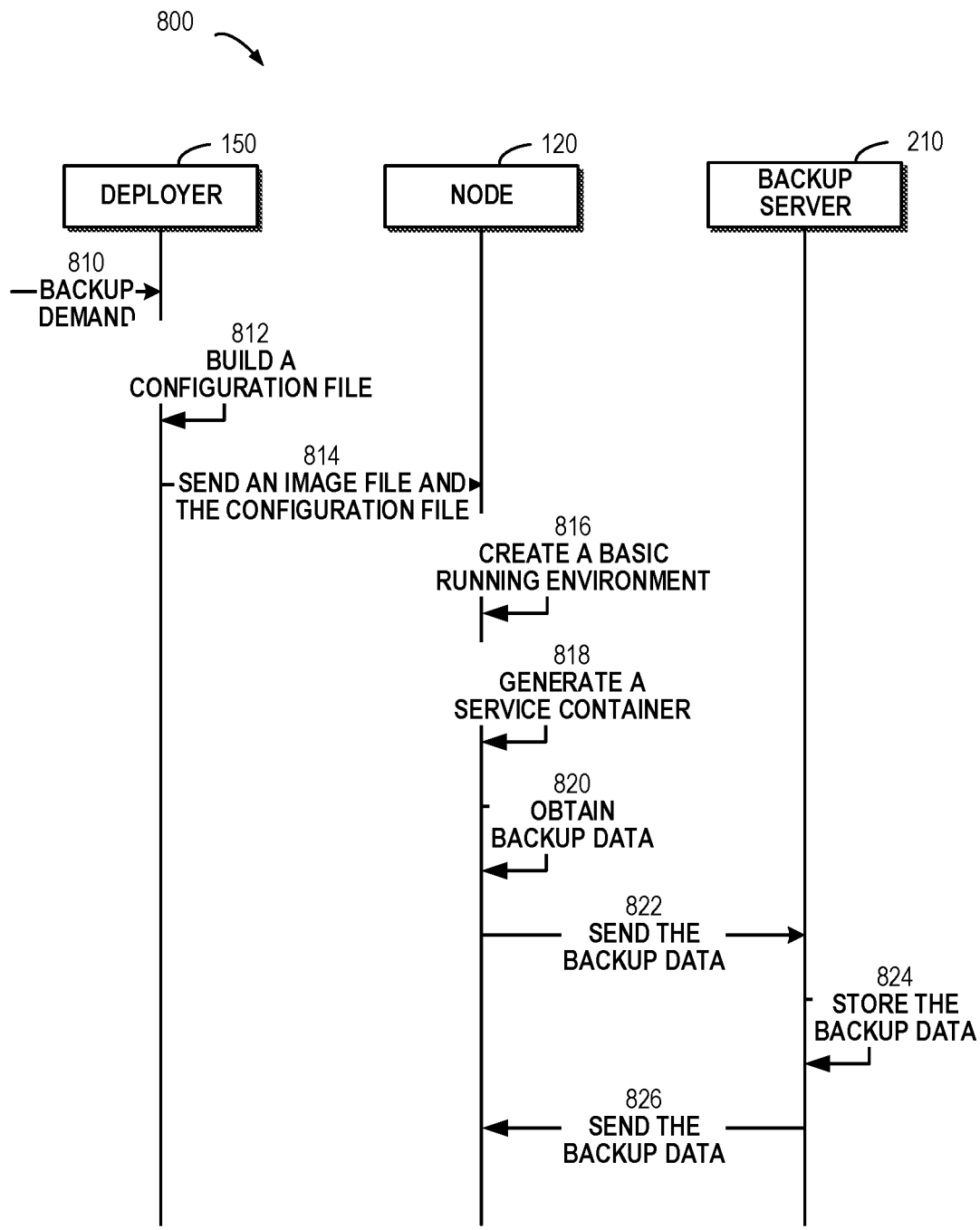
FIG. 8 schematically illustrates a block diagram of interaction between multiple components related to managing a group of service containers according to implementations of the present disclosure.

With reference to FIG. 8 below, description is presented to the detailed interaction process for managing a group of service containers. FIG. 8 schematically shows a block diagram 800 of interaction between multiple components related to managing a group of service containers. As depicted, as shown by an arrow 810, the deployer 150 may receive a backup demand and build the configuration file 220 on the basis of the backup demand (as shown by an arrow 812). As shown by an arrow 814, the deployer 150 may send the image file 154 and the configuration file 220 to the node 120. After receiving the image file 154, the node 120 may create a basic running environment on the basis of the image file 154. For example, as shown by an arrow 818, the service container 132 may be generated by running the configuration file 220 in the basic running environment.

Then as shown by an arrow 820, the generated service container 132 may obtain backup data on the basis of the backup agency 230 inside the service container. As shown by an arrow 822, the backup data may be sent to the backup server 210 from the backup agency at the node 120. As shown by an arrow 824, the backup server 210 may store the backup data, and send the same to the node 120 (as shown by an arrow 826) when necessary (e.g. receiving a request from the backup agency at the node).

As examples of the method according to the present disclosure have been described in detail with reference to FIGS. 2 to 8 above, the implementation of a corresponding apparatus will be described below. According to example implementations of the present disclosure, provided is an apparatus for managing service containers. The apparatus comprises: a building module configured to, in response to receiving a backup demand on a group of to-be-generated service containers, build a configuration file for generating the group of service containers on the basis of the backup demand, the configuration file comprising scripts for installing backup agencies that perform backup operations to the group of service containers; a loading module configured to load an image file for initializing the group of service containers to at least one node in a service container management system so as to create a group of basic running environments; and a deploying module configured to deploy the configuration file to the group of basic running environments to generate the group of service containers, so that a corresponding backup agency comprised in a corresponding service container in the group of generated service containers performs the backup operation to the group of generated service containers.

According to example implementations of the present disclosure, the building module is configured to: add to the configuration file configuration scripts for setting an environment of the backup agency; add to the configuration file installation scripts for installing the backup agency; and add to the configuration file setup scripts for setting a communication port of the backup agency.

According to example implementations of the present disclosure, the deploying module is configured to send an indication to the at least one node, so that scripts comprised in the configuration file are run in the group of basic running environments to generate the group of service containers.

According to example implementations of the present disclosure, the configuration file further comprises a backup policy associated with the backup operation.

According to example implementations of the present disclosure, the apparatus further comprises an indicating module configured to send an indication to a node where at least one part of service containers in the group of service containers reside, so that the at least one part of service containers perform the backup operation on the basis of the backup policy.

According to example implementations of the present disclosure, the apparatus further comprises a troubleshooting module configured to: in response to detecting a given service container in the group of service containers fails, load the image file to a node where the given service container resides so as to form a basic running environment; and deploy the configuration file to the basic running environment to generate a new service container, so that a backup agency comprised in the generated new service container performs the backup operation to the generated new service container.

According to example implementations of the present disclosure, provided is an apparatus for managing service containers. The apparatus comprises: a loading module configured to load at a service container management system an image file for initializing a group of to-be-generated service containers so as to form a group of basic running environments; a deploying module configured to, in response to receiving a configuration file for generating the group of service containers, deploy the configuration file to the group of basic running environment to generate the group of service containers, so that a corresponding backup agency comprised in a corresponding service container in the group of generated service containers performs a backup operation to the group of generated service containers, wherein the configuration file comprises scripts for installing backup agencies that perform backup operations to the group of service containers, and the configuration file is built on the basis of a backup demand on a group of to-be-generated service containers.

According to example implementations of the present disclosure, the configuration file comprises: configuration scripts for setting an environment of the backup agency; installation scripts for installing the backup agency; and setup scripts for setting a communication port of the backup agency.

According to example implementations of the present disclosure, the apparatus further comprises a running module configured to run scripts comprised in the configuration file in the group of basic running environments so as to generate the group of service containers.

According to example implementations of the present disclosure, the configuration file further comprises a backup policy associated with the backup operation.

According to example implementations of the present disclosure, the apparatus further comprises: a backup module configured to, at a service container in the group of service containers, use a backup agency in the service container to perform a backup operation to the service container on the basis of the backup policy.

According to example implementations of the present disclosure, the backup module is further configured to: use the backup agency to traverse a directory of the service container; and transmit data under the directory to a backup server associated with the backup agency.

Figure 9:
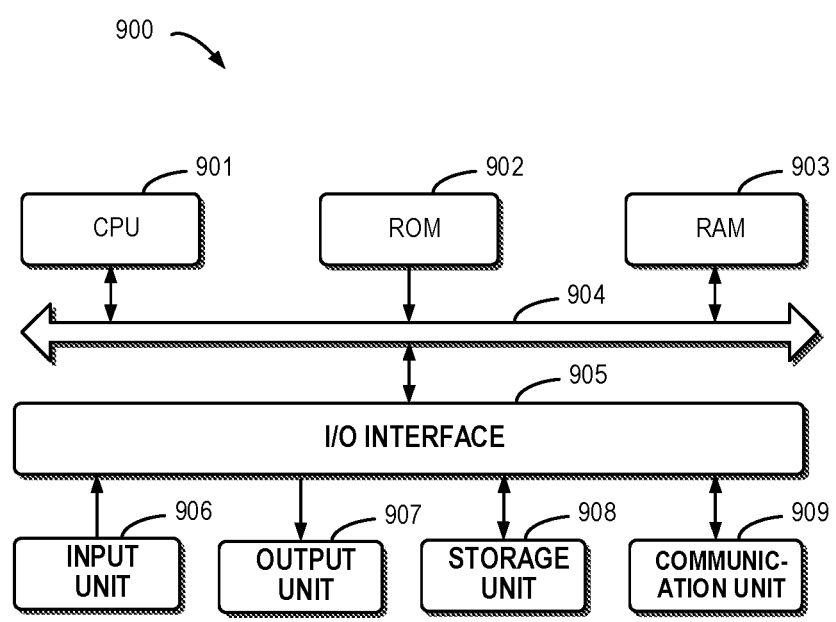
FIG. 9 schematically illustrates a block diagram of an apparatus for managing an application system according to example implementations of the present disclosure.

FIG. 9 schematically shows a block diagram of an apparatus 900 for managing service containers according to example implementations of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the methods 300 and 700, can also be executed by the processing unit 901. For example, in some implementations, the methods 300 and 700 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described methods 300 and 700 can be implemented. Alternatively, in other implementations, the CPU 901 also can be configured in other suitable manners to realize the above procedure/method.

According to example implementations of the present disclosure, there is provided an apparatus for managing service containers, the apparatus comprising: at least one processor; a volatile memory; and a memory coupled to the at least one processor, the memory having instructions stored thereon, the instructions, when executed by the at least one processor, causing the apparatus to perform acts. The acts comprise: in response to receiving a backup demand on a group of to-be-generated service containers, building a configuration file for generating the group of service containers on the basis of the backup demand, the configuration file comprising scripts for installing backup agencies that perform backup operations to the group of service containers; loading an image file for initializing the group of service containers to at least one node in a service container management system so as to create a group of basic running environments; and deploying the configuration file to the group of basic running environments to generate the group of service containers, so that a corresponding backup agency comprised in a corresponding service container in the group of generated service containers performs the backup operation to the group of generated service containers.

According to example implementations of the present disclosure, building the configuration file comprises: adding to the configuration file configuration scripts for setting an environment of the backup agency; adding to the configuration file installation scripts for installing the backup agency; and adding to the configuration file setup scripts for setting a communication port of the backup agency.

According to example implementations of the present disclosure, deploying the configuration file to the group of basic running environments so as to generate the group of service containers comprises: sending an indication to the at least one node, so that scripts comprised in the configuration file are run in the group of basic running environments to generate the group of service containers.

According to example implementations of the present disclosure, the configuration file further comprises a backup policy associated with the backup operation, and the acts further comprise: sending an indication to a node where at least one part of service containers in the group of service containers reside, so that the at least one part of service containers perform the backup operation on the basis of the backup policy.

According to example implementations of the present disclosure, the acts further comprise: in response to detecting a given service container in the group of service containers fails, loading the image file to a node where the given service container resides so as to form a basic running environment; and deploying the configuration file to the basic running environment to generate a new service container, so that a backup agency comprised in the generated new service container performs the backup operation to the generated new service container.

According to example implementations of the present disclosure, there is provided an apparatus for managing service containers, the apparatus comprising: at least one processor; a volatile memory; and a memory coupled to the at least one processor, the memory having instructions stored thereon, the instructions, when executed by the at least one processor, causing the apparatus to perform acts. The acts include: loading at a service container management system an image file for initializing a group of to-be-generated service containers so as to form a group of basic running environments; in response to receiving a configuration file for generating the group of service containers, deploying the configuration file to the group of basic running environment to generate the group of service containers, so that a corresponding backup agency comprised in a corresponding service container in the group of generated service containers performs a backup operation to the group of generated service containers, wherein the configuration file comprises scripts for installing backup agencies that perform backup operations to the group of service containers, and the configuration file is built on the basis of a backup demand on a group of to-be-generated service containers.

According to example implementations of the present disclosure, the configuration file comprises: configuration scripts for setting an environment of the backup agency; installation scripts for installing the backup agency; and setup scripts for setting a communication port of the backup agency.

According to example implementations of the present disclosure, the acts further comprise running scripts comprised in the configuration file in the group of basic running environments so as to generate the group of service containers.

According to example implementations of the present disclosure, the configuration file further comprises a backup policy associated with the backup operation, and the acts further comprise: at a service container in the group of service containers, using a backup agency in the service container to perform a backup operation to the service container on the basis of the backup policy.

According to example implementations of the present disclosure, performing the backup operation comprises: using the backup agency to traverse a directory of the service container; and transmitting data under the directory to a backup server associated with the backup agency.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing service containers, comprising:
in response to receiving a backup demand on a to-be-generated group of service containers, building a configuration file for generating the group of service containers on the basis of the backup demand, the configuration file comprising scripts for installing in each of the service containers backup agencies that perform backup operations to the group of service containers;
loading an image file for initializing the group of service containers to at least one node in a service container management system so as to create a group of basic running environments; and
deploying the configuration file to the group of basic running environments to generate the group of service containers, wherein each of the service containers includes an embedded backup agency, so that a corresponding backup agency comprised in a corresponding service container in the group of generated service containers performs the backup operation to the generated group of service containers;
upon detecting that a given service container in the group of service containers fails, generating a new service container to replace the given service container that failed by:
re-loading the image file to a node where the given service container resides so as to form a new basic running environment; and
re-deploying the configuration file to the new basic running environment to generate the new service container, so that a backup agency comprised in the generated new service container performs the backup operation to the generated new service container.

2. The method of claim 1, wherein building the configuration file comprises:
adding to the configuration file configuration scripts for setting an environment of the backup agency;
adding to the configuration file installation scripts for installing the backup agency; and
adding to the configuration file setup scripts for setting a communication port of the backup agency.

3. The method of claim 2, wherein deploying the configuration file to the group of basic running environments so as to generate the group of service containers comprises:
sending an indication to the at least one node, so that scripts comprised in the configuration file are run in the group of basic running environments to generate the group of service containers.

4. The method of claim 3, wherein the configuration file further comprises a backup policy associated with the backup operation, the method further comprising:
sending an indication to a node where at least one part of service containers in the group of service containers reside, so that the at least one part of service containers perform the backup operation on the basis of the backup policy.

5. A method for managing service containers, comprising:
loading at a service container management system an image file for initializing a to-be-generated group of service containers so as to form a group of basic running environments;
in response to receiving a configuration file for generating the group of service containers, deploying the configuration file to the group of basic running environment to generate the group of service containers, wherein each of the service containers includes an embedded backup agency, so that a corresponding backup agency comprised in a corresponding service container in the group of generated service containers performs a backup operation to the generated group of service containers;
wherein the configuration file comprises scripts for installing in each of the service containers backup agencies that perform backup operations to the group of service containers, and the configuration file is built on the basis of a backup demand on a group of to-be-generated service containers;
upon detecting that a given service container in the group of service containers fails, generating a new service container to replace the given service container that failed by:
re-loading the image file to a node where the given service container resides so as to form a new basic running environment; and
re-deploying the configuration file to the new basic running environment to generate the new service container, so that a backup agency comprised in the generated new service container performs the backup operation to the generated new service container.

6. The method of claim 5, wherein the configuration file comprises:
configuration scripts for setting an environment of the backup agency;
installation scripts for installing the backup agency; and
setup scripts for setting a communication port of the backup agency.

7. The method of claim 6, further comprising:
running scripts comprised in the configuration file in the group of basic running environments so as to generate the group of service containers.

8. The method of claim 7, wherein the configuration file further comprises a backup policy associated with the backup operation, the method further comprising:
at a service container in the group of service containers, using a backup agency in the service container to perform a backup operation to the service container on the basis of the backup policy.

9. The method of claim 7, wherein performing the backup operation comprises:
using the backup agency to traverse a directory of the service container; and
transmitting data under the directory to a backup server associated with the backup agency.

10. An apparatus for managing service containers, comprising:
at least one processor;
a volatile memory; and
a memory coupled to the at least one processor and having instructions stored thereon, which when executed by the at least one processor, causing the at least one processor to perform operations, the operations comprising:
in response to receiving a backup demand on a to-be-generated group of service containers, building a configuration file for generating the group of service containers on the basis of the backup demand, the configuration file comprising scripts for installing in each of the service containers backup agencies that perform backup operations to the group of service containers;

loading an image file for initializing the group of service containers to at least one node in a service container management system so as to create a group of basic running environments; and deploying the configuration file to the group of basic running environments to generate the group of service containers, wherein each of the service containers includes an embedded backup agency, so that a corresponding backup agency comprised in a corresponding service container in the group of generated service containers performs the backup operation to the generated group of service containers;

upon detecting that a given service container in the group of service containers fails, generating a new service container to replace the given service container that failed by:

re-loading the image file to a node where the given service container resides so as to form a new basic running environment; and re-deploying the configuration file to the new basic running environment to generate the new service container, so that a backup agency comprised in the generated new service container performs the backup operation to the generated new service container.

11. The apparatus of claim 10, wherein building the configuration file comprises:

adding to the configuration file configuration scripts for setting an environment of the backup agency;

adding to the configuration file installation scripts for installing the backup agency; and adding to the configuration file setup scripts for setting a communication port of the backup agency.

12. The apparatus of claim 11, wherein deploying the configuration file to the group of basic running environments so as to generate the group of service containers comprises:

sending an indication to the at least one node, so that scripts comprised in the configuration file are run in the group of basic running environments to generate the group of service containers.

13. The apparatus of claim 12, wherein the configuration file further comprises a backup policy associated with the backup operation, wherein the operations further comprise:

sending an indication to a node where at least one part of service containers in the group of service containers reside, so that the at least one part of service containers perform the backup operation on the basis of the backup policy.

14. An apparatus for managing service containers, comprising:

at least one processor;

a volatile memory; and a memory coupled to the at least one processor and having instructions stored thereon, which when executed by the at least one processor, causing the at least one processor to perform operations, the operations comprising:

loading at a service container management system an image file for initializing a to-be-generated group of service containers so as to form a group of basic running environments;

in response to receiving a configuration file for generating the group of service containers, deploying the configuration file to the group of basic running environment to generate the group of service containers, wherein each of the service containers includes an embedded backup agency, so that a corresponding backup agency comprised in a corresponding service container in the group of generated service containers performs a backup operation to the generated group of service containers;

wherein the configuration file comprises scripts for installing in each of the service containers backup agencies that perform backup operations to the group of service containers, and the configuration file is built on the basis of a backup demand on a group of to-be-generated service containers;

upon detecting that a given service container in the group of service containers fails, generating a new service container to replace the given service container that failed by:

re-loading the image file to a node where the given service container resides so as to form a new basic running environment; and re-deploying the configuration file to the new basic running environment to generate the new service container, so that a backup agency comprised in the generated new service container performs the backup operation to the generated new service container.

15. The apparatus of claim 14, wherein the configuration file comprises:

configuration scripts for setting an environment of the backup agency;

installation scripts for installing the backup agency; and setup scripts for setting a communication port of the backup agency.

16. The apparatus of claim 15, wherein the operations further comprise:

running scripts comprised in the configuration file in the group of basic running environments so as to generate the group of service containers.

17. The apparatus of claim 16, wherein the configuration file further comprises a backup policy associated with the backup operation, wherein the operations further comprise:

at a service container in the group of service containers, using a backup agency in the service container to perform a backup operation to the service container on the basis of the backup policy.

18. The apparatus of claim 16, wherein performing the backup operation comprises:

using the backup agency to traverse a directory of the service container; and transmitting data under the directory to a backup server associated with the backup agency.

* * * * *